US008538860B1

(12) United States Patent
Fonss et al.

(10) Patent No.: US 8,538,860 B1
(45) Date of Patent: Sep. 17, 2013

(54) SYSTEM AND METHOD FOR THE CREATION AND REBALANCING OF BENEFICIAL INTERESTS IN INDEX TRACKING AND OTHER INVESTMENT VEHICLES OVER MULTIPLE MARKET PERIODS USING FIXED OR REGULARLY RESETTING PRICES TO CALIBRATE OUTSTANDING INTEREST COUNTS WITH LIQUIDATION ENTITLEMENTS

(75) Inventors: Jack Fonss, New Canaan, CT (US); Forrest G Gilman, Closter, NJ (US); Edward J Cataldo, Jr., Westport, CT (US)

(73) Assignee: Accushares Holdings LLC, New Canaan, CT (US)

( * ) Notice: Subject to any disclaimer, the term of this patent is extended or adjusted under 35 U.S.C. 154(b) by 0 days.

(21) Appl. No.: 13/619,643

(22) Filed: Sep. 14, 2012

Related U.S. Application Data

(60) Provisional application No. 61/535,644, filed on Sep. 16, 2011, provisional application No. 61/547,393, filed on Oct. 14, 2011.

(51) Int. Cl.
*G06Q 40/00* (2012.01)
(52) U.S. Cl.
CPC ................................... *G06Q 40/00* (2013.01)
USPC .......................................................... 705/37
(58) Field of Classification Search
None
See application file for complete search history.

(56) References Cited

U.S. PATENT DOCUMENTS

| 5,987,435 A | 11/1999 | Weiss et al. | |
|---|---|---|---|
| 6,513,020 B1* | 1/2003 | Weiss et al. | 705/36 R |
| 2008/0046292 A1 | 2/2008 | Myers et al. | |
| 2011/0087679 A1 | 4/2011 | Rosato et al. | |
| 2011/0191234 A1* | 8/2011 | Kiron | 705/37 |
| 2011/0289017 A1 | 11/2011 | Renshaw | |
| 2012/0078773 A1* | 3/2012 | Seale et al. | 705/37 |
| 2012/0078774 A1* | 3/2012 | Seale et al. | 705/37 |
| 2012/0150767 A1* | 6/2012 | Chacko et al. | 705/36 R |
| 2012/0166326 A1* | 6/2012 | Sapir et al. | 705/37 |

OTHER PUBLICATIONS

U.S. Appl. No. 61/501,231, filed Jun. 26, 2011, entitled "System and Method for the Creation and Rebalancing of Beneficial Interests in Index Tracking Investment Vehicles Over Multiple Market Periods" (87 pages).
U.S. Appl. No. 61/515,310, filed Aug. 4, 2011, entitled "System and Method for the Creation and Rebalancing of Beneficial Interests in Index Tracking Investment Vehicles Over Multiple Market Periods" (117 pages).

(Continued)

*Primary Examiner* — Bruce I Ebersman
(74) *Attorney, Agent, or Firm* — McCarter & English, LLP

(57) ABSTRACT

A method and system are disclosed which creates, modifies and manipulates the units of a collective investment vehicle, and which accurately tracks a linked index or specific investment strategy through the execution of steps including: creating units at a fixed price and fixed par value at the opening of any market period; modifying of the par value of units which are traded between investors to a fixed initial par value; creating of the intra-period price values which links unit par value to returns for the applicable partial period to produce a system generated intra-day transacting price; and at the close of each market period, a manipulation of the number of units outstanding, such that the units reflect an equivalent value based on a reset to the initial fixed price, and further such that the par value is adjusted in a counterbalancing direction.

19 Claims, 13 Drawing Sheets

(56) References Cited

OTHER PUBLICATIONS

U.S. Appl. No. 61/535,644, filed Sep. 16, 2011, entitled "System and Method for the Creation and Rebalancing of Beneficial Interests in Index Tracking Investment Vehicles Over Multiple Market Periods" (135 pages).
U.S. Appl. No. 61/547,393, filed Oct. 14, 2011, entitled "System and Method for the Creation and Rebalancing of Beneficial Interests in Index Tracking Investment Vehicles Over Multiple Market Periods" (154 pages).
U.S. Appl. No. 61/611,267, filed Mar. 15, 2012, entitled "A Processing System for Creating and Transforming Two Claims of a Single Issuer Entity at System Determined Intervals Based on a Variable or Index" (21 pages).
U.S. Appl. No. 61/622,179, filed Apr. 10, 2012, entitled "Processing System for Creating, Monitoring and Transforming Multiple Interests of One or More Issuer Entities at System Determined Intervals Based on a Variable or Index" (32 pages).
Co-pending U.S. Appl. No. 13/350,012, filed Jan. 13, 2012, entitled "System and Method for Creation and Rebalancing of Beneficial Interests in Tracking Investment Vehicles Over Multiple Market Periods" (108 pages).
Co-pending U.S. Appl. No. 13/767,622, filed Feb. 14, 2013, entitled "A System and Process for Creating, Monitoring and Transforming Multiple Interests of One or More Issuer Entities at System Determined Intervals Based on a Variable or Index" (89 pages).
Election/Restriction mailed on Apr. 27, 2012, issued in connection with Co-Pending U.S. Appl. No. 13/350,012 (8 pages).
Response to Election/Restriction mailed on Apr. 27, 2012, issued in connection with Co-Pending U.S. Appl. No. 13/350,012 (10 pages).
Election/Restriction mailed on Jun. 12, 2012, issued in connection with Co-Pending U.S. Appl. No. 13/350,012 (6 pages).
Response to Election/Restriction mailed on Jun. 12, 2012, issued in connection with Co-Pending U.S. Appl. No. 13/350,012 (7 pages).
Notice of Non-Compliant Amendment mailed Aug. 23, 2012, issued in connection with Co-Pending U.S. Appl. No. 13/350,012 (2 pages).
Response to Notice of Non-Compliant Amendment mailed Aug. 23, 2012, issued in connection with Co-Pending U.S. Appl. No. 13/350,012 (7 pages).
Office Action mailed on Feb. 25, 2013, issued in connection with Co-Pending U.S. Appl. No. 13/350,012 (9 pages).
U.S. Securities and Exchange Commission website, Leveraged and Inverse ETFs: Specialized Products with Extra Risks for Buy-and-Hold In, pp. 1-4, http://www.sec.gov/investor/pubs/leveragedetfs-alert.htm (4 pages).
ProFunds Group, ProFunds Group Investor Education Series, "The Universal Effects of Compounding and Leveraged Funds", vol. 1, Spring 2009, pp. 1-2 http://www.profunds.com/media/pdf/publications/CompVol1072809.pdf (2 pages).

* cited by examiner

FIGURE 2

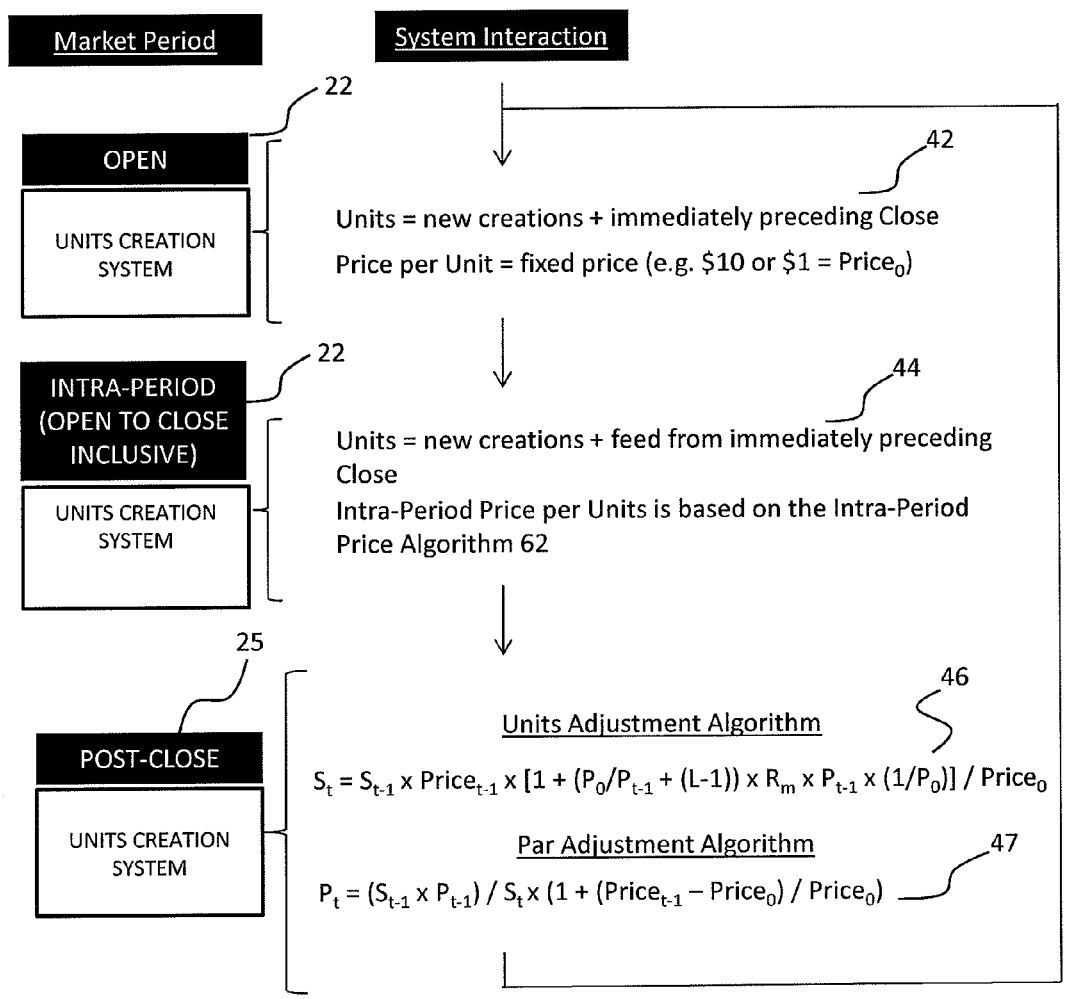

where: 48
S = units outstanding
$Price_{t-1}$ = the acquisition price during the related period or $Price_0$ for pre-existing units
P = Par or essentially similar notional value, $P_0$ = $0.01, $1.00, or another fixed value
L = fund leverage (e.g. +2 for a 2X leveraged fund and -1 for a 100% inverse fund)
$R_m$ = fund or index return for the related market period
Price0 = creation price (e.g. $10, $1.00, or an alternate fixed positive value)

FIGURE 3

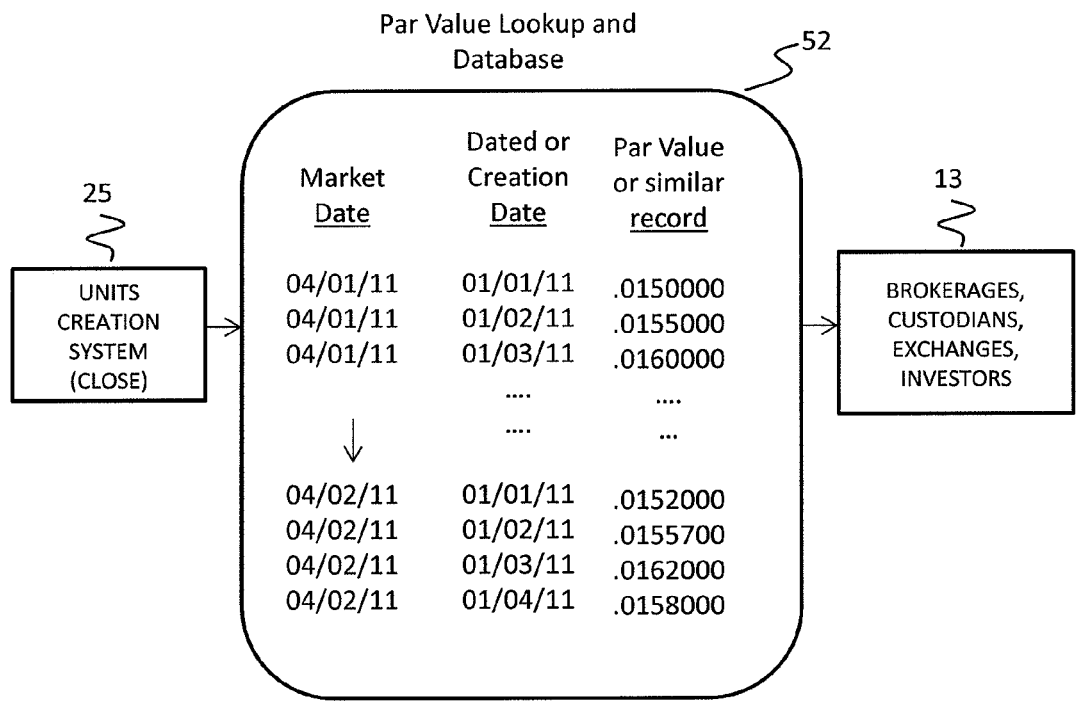

For any Market Date, the Unit Creation System can be accessed by the dated/creation date to either revalidate the applicable number of units for a holder or to reconstruct intervening holdings an values Where assets are sold for fees or expenses or otherwise moved beyond the reach of unit holder claims, Par Value will be re-calculated in a manner essentially similar to :  — 56

$$P_t' = P_t - [\% \text{ of assets removed}] \times P_t$$

where:
P = Par or similar record value
S = number of shares or units, for either a holder or 1 hypothetical unit holding as of the related dated/creation date

FIGURE 4

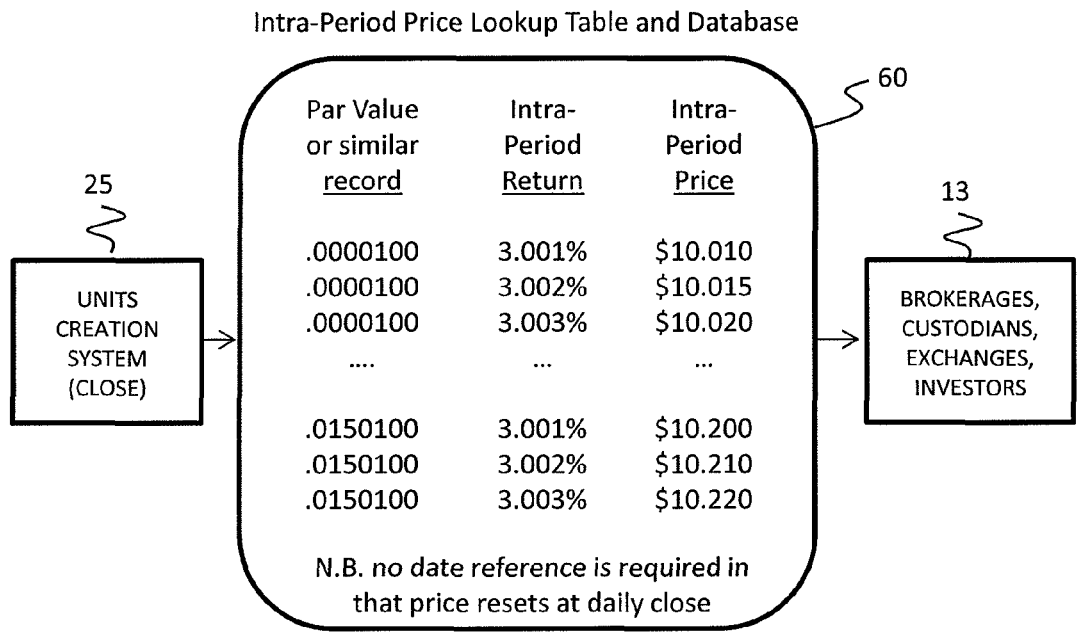

At any time during a market period, the Unit Creation System can be accessed by the immediately preceding (or current) par value to determine the intra-period price for a unit. The Intra-Period Price can reside within the system as either a static table or computer algorithm Intra-period Price will be calculated in a manner essentially similar to:

Intra-Period Price Algorithm   62

$$Price_m = Price_{t-1} \times [1 + (P_0/P_{t-1} + (L-1)) \times R_m \times P_{t-1} \times (1/P_0)]$$

63 where:
Price is reset to a fixed value (e.g. $10 or $1/unit) at each close and initial (creation) Par is $P_0$
$Price_m$ = per unit price during a market period
P = Par or similar record value (t-1 indicates as of the immediately preceding or related market open)
L = fund leverage factor as an absolute value (e.g. 2 for 2x levered fund, and 1 for -1x inverse fund)
$R_m$ = the fund or index return during the related market period (i.e. intra-day) inclusive of fees and expenses where applicable

FIGURE 5

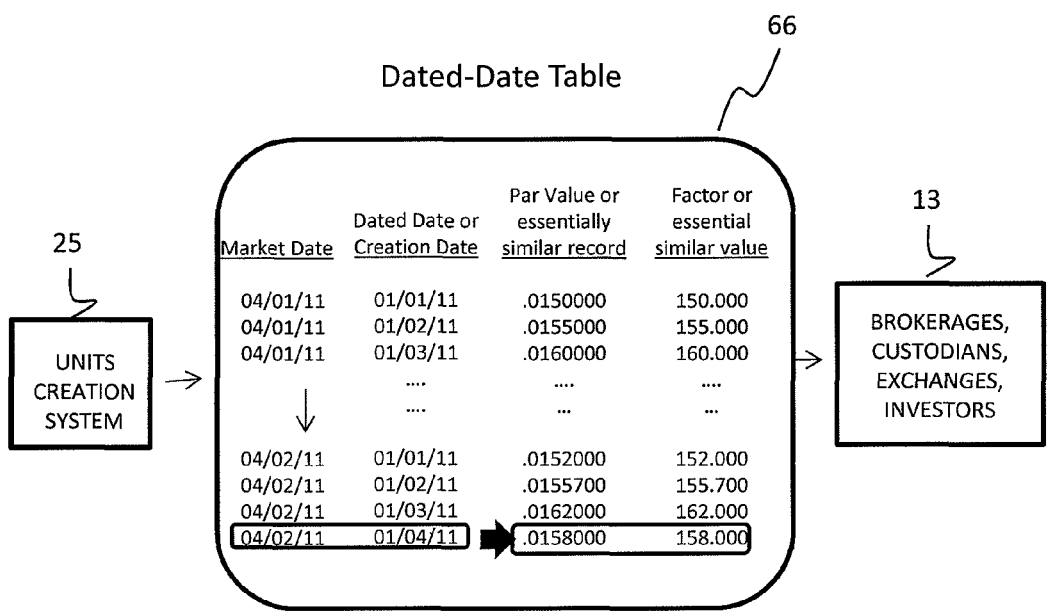

As illustrated above, the system or system computers will index into a dataset similar to that depicted above, and through a unique record identification, such unique record identification specified by (x) the related market period identifier, (y) the dated date or creation date of the related units In this alternate embodiment, the value drawn from the dataset will be used in an essentially similar manner in order for the system to perform the unit manipulation demonstrated in attached exhibits

FIGURE 7

DISCLOSED: INVERSE -1

| period | return | closing intra-period price | units | par | post adjust price | value | return |
|---|---|---|---|---|---|---|---|
| 0 | issue | 10.00 | 10.000 | 0.01000 |  | 100.00 | na |
| 1 | 25% | 7.50 | 7.500 | 0.01333 | 10.00 | 75.00 | -25.00% |
| 2 | -15% | 11.50 | 9.375 | 0.01067 | 10.00 | 93.75 | -6.25% |
| 3 | 15% | 8.50 | 7.781 | 0.01285 | 10.00 | 77.81 | -22.19% |
| 4 | -25% | 12.50 | 10.836 | 0.00923 | 10.00 | 108.36 | 8.36% |
| 5 | 0% | 10.00 | 10.836 | 0.00923 | 10.00 | 108.36 | 8.36% |

DISCLOSED: LEVERAGED +2

| period | return | closing intra-period price | units | par | post adjust price | value | return |
|---|---|---|---|---|---|---|---|
| 0 | issue | 10.00 | 10.000 | 0.01000 |  | 100.00 | na |
| 1 | 25% | 15.00 | 15.000 | 0.00667 | 10.00 | 150.00 | 50.00% |
| 2 | -15% | 7.00 | 11.250 | 0.00889 | 10.00 | 112.50 | 12.50% |
| 3 | 15% | 13.00 | 14.438 | 0.00693 | 10.00 | 144.38 | 44.38% |
| 4 | -25% | 5.00 | 8.328 | 0.01201 | 10.00 | 83.28 | -16.72% |
| 5 | 0% | 10.00 | 8.328 | 0.01201 | 10.00 | 83.28 | -16.72% |

FIGURE 7A

CURRENT FUND METHODS VERSUS DISCLOSED INVENTION

A C

| period | daily index return | cumulative return | INVERSE OR SHORT FUND (-1x) | | | | | | |
|---|---|---|---|---|---|---|---|---|---|
| | | | leverage: -1 | | | | | | |
| | | | J short | J cash/debt | J equity | proforma leverage | shares | price/ share | running value |
| 0 | | | (100.00) | 200.00 | 100.00 | (1.00) | 10.00 | $10.00 | |
| 1 (index move) | 25.0% | 25.00% | (125.00) | 200.00 | 75.00 | (1.67) | | | |
| 1 (rebalanced) | | | (75.00) | 150.00 | 75.00 | (1.00) | 10.00 | $7.50 | $75.00 |
| 2 (index move) | -15.0% | 6.25% | (63.75) | 150.00 | 86.25 | (0.74) | | | |
| 2 (rebalanced) | | | (86.25) | 172.50 | 86.25 | (1.00) | 10.00 | $8.63 | $86.25 |
| 3 (index move) | 15.0% | 22.19% | (99.19) | 172.50 | 73.31 | (1.35) | | | |
| 3 (rebalanced) | | | (73.31) | 146.63 | 73.31 | (1.00) | 10.00 | $7.33 | $73.31 |
| 4 (index move) | -25.0% | -8.36% | (54.98) | 146.63 | 91.64 | (0.60) | | | |
| 4 (rebalanced) | | | (91.64) | 183.28 | 91.64 | (1.00) | 10.00 | $9.16 | $91.64 |
| 5 (index move) | 0.0% | -8.36% | (91.64) | 183.28 | 91.64 | (1.00) | | | |
| 5 (rebalanced) | | | (91.64) | 183.28 | 91.64 | (1.00) | 10.00 | $9.16 | $91.64 |
| | Final | -8.36% | | | | | | | |
| | -1x: | 8.36% | | | | | | Final: | 91.64 |
| | | | | | | | | Theoretical: | 108.36 |
| | | | | | | | | Shortfall: | 16.72 |
| | | | | | | | | Shortfall %: | -16.72% |

80

B D

| period | daily index return | cumulative return | LEVERAGED OR LONG FUND (+2x) | | | | | | |
|---|---|---|---|---|---|---|---|---|---|
| | | | leverage: 2 | | | | | | |
| | | | K long | K cash/debt | K equity | proforma leverage | shares | price/ share | running value |
| 0 | | | 200.00 | (100.00) | 100.00 | 2.00 | 10.00 | $10.00 | |
| 1 (index move) | 25.0% | 25.00% | 250.00 | (100.00) | 150.00 | 1.67 | | | |
| 1 (rebalanced) | | | 300.00 | (150.00) | 150.00 | 2.00 | 10.00 | $15.00 | $150.00 |
| 2 (index move) | -15.0% | 6.25% | 255.00 | (150.00) | 105.00 | 2.43 | | | |
| 2 (rebalanced) | | | 210.00 | (105.00) | 105.00 | 2.00 | 10.00 | $10.50 | $105.00 |
| 3 (index move) | 15.0% | 22.19% | 241.50 | (105.00) | 136.50 | 1.77 | | | |
| 3 (rebalanced) | | | 273.00 | (136.50) | 136.50 | 2.00 | 10.00 | $13.65 | $136.50 |
| 4 (index move) | -25.0% | -8.36% | 204.75 | (136.50) | 68.25 | 3.00 | | | |
| 4 (rebalanced) | | | 136.50 | (68.25) | 68.25 | 2.00 | 10.00 | $6.83 | $68.25 |
| 5 (index move) | 0.0% | -8.36% | 136.50 | (68.25) | 68.25 | 2.00 | | | |
| 5 (rebalanced) | | | 136.50 | (68.25) | 68.25 | 2.00 | 10.00 | $6.83 | $68.25 |
| | Final | -8.36% | | | | | | | |
| | +2x: | -16.72% | | | | | | Final: | 68.25 |
| | | | | | | | | Theoretical: | 83.28 |
| | | | | | | | | Shortfall: | 15.03 |
| | | | | | | | | Shortfall %: | -15.03% |

82

INVERSE OR SHORT FUND (-1x)
Current Fund Methods                91.64
Disclosed Invention                108.36
Arithmetically Correct Return      108.36

LEVERAGED OR LONG FUND (+2x)
Current Fund Methods                68.25
Disclosed Invention                 83.28
Arithmetically Correct Return       83.28

SYSTEM AND METHOD FOR THE CREATION AND REBALANCING OF BENEFICIAL INTERESTS IN INDEX TRACKING AND OTHER INVESTMENT VEHICLES OVER MULTIPLE MARKET PERIODS USING FIXED OR REGULARLY RESETTING PRICES TO CALIBRATE OUTSTANDING INTEREST COUNTS WITH LIQUIDATION ENTITLEMENTS

FIELD OF THE DISCLOSED EMBODIMENTS

The disclosed embodiments relate to the field of information processing and management in the context of a specific process residing on a computer system, and more specifically, to systems and methods for creating, processing, and manipulating the beneficial interests in collective investment vehicles.

BACKGROUND OF THE DISCLOSED EMBODIMENTS

The majority of collective investment vehicles holdings are in the form of mutual funds, exchange traded funds, exchange traded notes, trust vehicles, and other similar collective arrangements. These collective arrangements have the benefit of bundling a collection of assets and other financial contracts into a single investable instrument for an investor. Depending upon the related investment strategy and the anticipated target investor audience, one form of collective arrangement may typically be preferred (e.g. exchange traded fund or "ETF", exchange traded note or "ETN", mutual fund, or other).

Investment vehicles provide an important service to the individual and (non-financial) institutional investor. Such vehicles warehouse and manage a collection of assets, liabilities and other financial contracts. They allow investors to access instruments, returns and market directionality that are otherwise unobtainable in conventional investments.

The availability of these vehicles and opportunities is an important public policy matter. For example, they serve to reduce or eliminate the structural disadvantages which smaller investors may suffer. That is, smaller investors generally traffic in a less complete, less comprehensive, and less competitively priced marketplace.

Early examples of collective investment vehicles include money market funds, traditional mutual funds, and exchange traded funds with unleveraged returns over a portfolio of securities holdings.

A more recent extension of the collective investment vehicle has been vehicles which purport and attempt to provide investors with investment returns which are either: (a) inversely related to the movement in a related index (the "Inverse Return Vehicles"); or (b) positively related to index returns and amplified through a leveraging arrangement (the "Leveraged Return Vehicles"). Inverse Return Vehicles enjoy positive returns when the related index declines in value. For example, an Inverse Return Vehicle on U.S. equities would increase in value as the U.S. equity index it tracks declines.

On the other hand, Leveraged Return Vehicles enjoy amplified returns relating to the applicable index and may be directionally positive or negative. For example Leveraged Investment Vehicles on a foreign currency would enjoy increased value if the foreign currency appreciated. The level of increase or gain in the fund would be magnified by a multiple of the leverage.

Public Policy Considerations

The availability of sophisticated collective investment vehicles is an important public policy goal. An equally pressing public policy goal should be to engineer (or reengineer) collective investment vehicles to deliver accurate strategy and returns to the investing public. As of Jun. 30, 2012, the market capitalization of leveraged funds exceeded $13 billion. The market capitalization of inverse funds exceeded $17 billion. Also, as of Jun. 30, 2012, the aggregate amount of money market funds was approximately $2.5 trillion.

Structured funds are subject to delivering returns which can and have deviated dramatically from their investment objective. The market response to the deficiency in performance in leveraged and inverse funds has been to tweak the disclosure to limit the applicability of the fund's headline strategy to a single trading day. Structured funds are subject to considerable tracking error from the linked index. In addition, the results can sometimes be the opposite of what the fund purports to deliver.

The U.S. Securities and Exchange Commission (SEC) addressed the matter in a release entitled "*Leveraged and Inverse ETFs: Specialized Products with Extra Risks for Buy-and-Hold Investors*", August 2009; see (http://www.sec.gov/investor/pubs/leveragedetfs-alert.htm). In response to the SEC release and commentator criticism, the fund community largely responded by tweaking fund disclosure to absolve the funds from suitable performance for periods which extend beyond a single trading day. A typical example of structured fund disclosure is as follows:

"... [the fund] seeks a return of −100% of the return of an index (target) for a single day (before fees and expenses). Due to the compounding of daily returns, returns over periods other than one day will likely differ in amount and possibly direction from the target return for the same period. Investors should monitor holdings consistent with their strategies, as frequently as daily ... "

Source: ProShares Short S&P500 Fact Sheet as of Sep. 30, 2010.

One point which distinguishes the disclosed embodiments from the current state of the art is the elimination, in the disclosed embodiments, of adverse path dependency. Under adverse path dependency, if the periodic index movements change direction (i.e. the index return series is not monotonic), the beneficial interests in such investment vehicles will underperform versus their targeted return. Returns may also be opposite from that intended.

As highlighted in the above referenced SEC release, the current state of the art investment vehicle performance may diverge from its intended course when measured over more than a single trading day. The disclosed embodiments by contrast cause the units to essentially track the intended course in typical market conditions for extended periods of time. As a consequence, the system outlined in the disclosed embodiments introduces a beneficial long term aspect to the securities market, investing and risk management in contrast to the one day speculative nature of the current fund arrangements.

SUMMARY OF THE DISCLOSED EMBODIMENTS

The disclosed technology provides systems and processes which create and modify the beneficial interests (shares, notes, or other investment units, the "interests" or "units") in collective investment vehicles (funds, trusts, or other collective arrangements). The disclosed process is specifically applied to create units, and subsequently modify the created units, such that the units can be sold, pledged, or otherwise transacted as an article of property with precise value based on fund parameters.

The disclosed technology encompasses systems which communicate with securities exchanges, market makers, brokerage firms, custodians, investors, and the administrator of the investment vehicle. Such communications enable the market value of the Interests to accurately track an underlying reference index, over time horizons equal to or longer than one trading day. Such accurate tracking occurs even in a collective investment vehicle relating to inverse returns.

In addition to long term index tracking, the disclosed technology causes each holder of an interest to begin and end with consistent index tracking regardless of acquisition timing. In particular, the disclosed technology communicates and processes the information associated with daily beneficial interest rebalancing such that:

(i) the investor's individual holdings correctly track the returns of the desired index over multiple market periods;

(ii) the investor's holdings are continuously tradable during the course of a market period at then prevailing prices;

(iii) the fund or vehicle administrator may accurately manage the assets and liabilities held by the fund to conform with (i) above; and (iv) during unexpected movements in the related index or during anomalous market conditions, the system enables the fund administrator to identify units for redemption to ensure that the net asset value of the fund is maintained at an appropriately positive level.

The disclosed technology entails specific algorithms and routines running on computer systems. In addition, the disclosed technology can store the above information in databases for access by the parties to the units. The process, system, and created units solve an intractable problem in the structured funds space relating to both path-dependency and constant-leverage.

BRIEF DESCRIPTION OF THE DRAWINGS

In the drawings, which are not meant to be limiting, the following are illustrated:

FIG. 2 is a flowchart of an exemplary implementation of the disclosed technology and related systems; as depicted, the system performs tasks essentially similar to those listed, including but not limited to the initial creation of units, the facilitation of transacting in the units, and the algorithmic manipulation of the units to ensure the targeted returns are delivered;

FIG. 3 is a tabular illustration of the system data storage and manipulation of the par value (or essentially similar notional value of an interest or a unit) accompanied by an exemplary method to affect such values;

FIG. 4 is a tabular illustration of the system data storage and live data creation of intra-period creation or redemption and market prices; the Figure includes an exemplary method for bounding the intra-period prices; system creations occur at levels equal to or higher than those represented in the algorithm, and system redemptions occur at levels equal to or less than those represented in the algorithm;

FIG. 5 is a tabular illustration of the data creation, storage, and data access methods for an alternative embodiment of the par value metric;

FIG. 7 is a tabular real-world example of the disclosed technology over two fund types over 5 market periods;

FIG. 7A is a tabular comparison of current inverse and leveraged fund methods with the disclosed technology;

DETAILED DESCRIPTION OF THE DISCLOSED EMBODIMENTS

The disclosed technology provides systems and processes that create, process, repeatedly modify, and otherwise manage the beneficial interests and the holdings of a collective investment vehicle. As used herein, the terms "beneficial interest", "interest", "units", or "shares" are used interchangeably. Also as used herein, the terms "collective investment vehicle", "investment vehicle", and "fund" are used interchangeably.

An exemplary disclosed embodiment creates the units to be held by investors. The disclosed embodiment modifies the outstanding units, such that their return properly tracks the targeted index. As will be clear from the description below, various disclosed embodiments comprise computer-implemented processes and related computer systems, data storage, and networks.

Exemplary disclosed embodiments entail administration and management of a collective investment vehicle. Such administration and management address the deficiencies and failings of existing fund arrangements which purport to offer inverse or leveraged index returns.

The fund may be implemented in a variety of vehicle forms. Such forms include a fund, a partnership, a trust, notes of an entity, derivatives claims, or interests in an entity including but not limited to a corporation.

The units may be implemented in a variety of forms. Such forms include notes, deposits, shares, units interests, or hybrids thereof.

Figure 1:
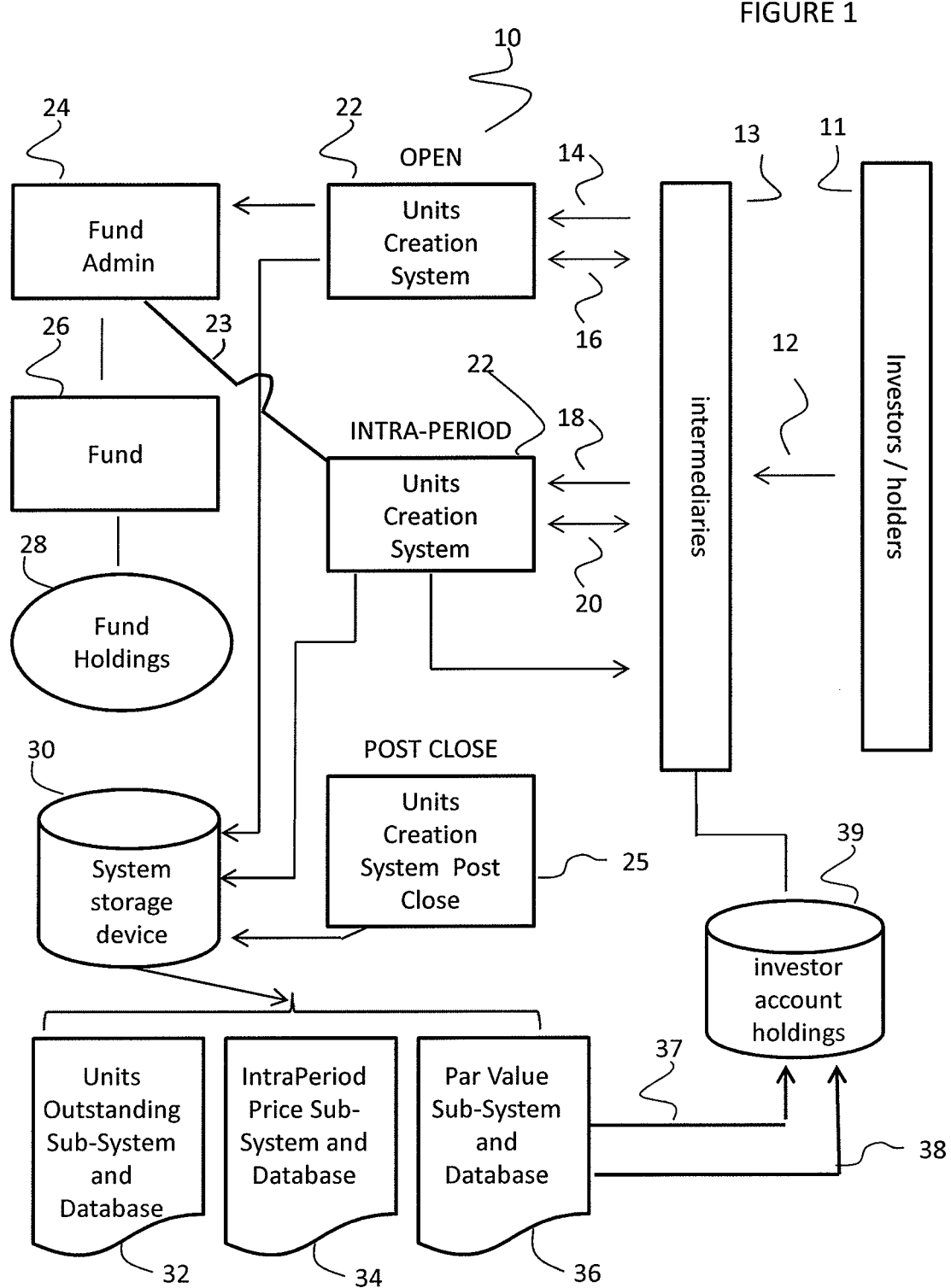
FIG. 1 is a block diagram of an exemplary arrangement of fund entities and summary interactions under the disclosed technology, where this block diagram illustrates the process of creating units by the methods of the system, so that the system is at least in part a units creation system.

[FIG. 1, with cross references to FIGS. 2, 3, and 4]

Reference will now be made to FIGS. 1-4. The following is a summary of the Figures which will be described in greater detail below. FIG. 1 is a block diagram of an exemplary arrangement of the fund entities and summary interactions under the disclosed technology. This block diagram illustrates the process of creating units by the methods of the system, so that the system is at least in part a "units creation system." FIG. 2 is a flowchart of an exemplary implementation of the disclosed technology and related systems. As depicted, the system performs tasks essentially similar to those listed, including but not limited to the initial creation of units, the facilitation of transacting in the units, and the algorithmic manipulation of the units to ensure the targeted returns are delivered.

In addition, FIG. 3 is a tabular illustration of the system data storage and manipulation of the par value (or essentially similar notional value of an interest or a unit) accompanied by an exemplary method to affect such values. FIG. 4 is a tabular illustration of the system data storage and live data creation of intra-period creation or redemption and market prices. This Figure includes an exemplary method for bounding the intra-period prices. System creations occur at levels equal to or higher than those represented in the algorithm, and system redemptions occur at levels equal to or less than those represented in the algorithm.

In addition, FIG. 1 can be followed in sequence to demonstrate the processes and actions undertaken by the system 10. In the following discussion of FIG. 1, the term "intermediary" is used to refer at any of a broker, dealer, custodian, exchange, or similar parties acting in the role of an intermediary for the investment vehicle.

In reference to FIG. 1, the sequence of steps is explicitly sequenced for clarity of presenting the following detail. However the sequence presented should be considered to include certain steps being executed simultaneously or certain algorithms being reordered to arrive at the same system results. Further, the investment vehicles considered herein typically have incidental expenses (fees, other transactional costs, and interest expense) and incidental income relating to the holding of cash and related positions. Such amounts should be regarded as integrated into the periodic fund or index return denoted as $R_m$ in FIG. 2, the Units Adjustment Algorithm 46.

Figure 8:
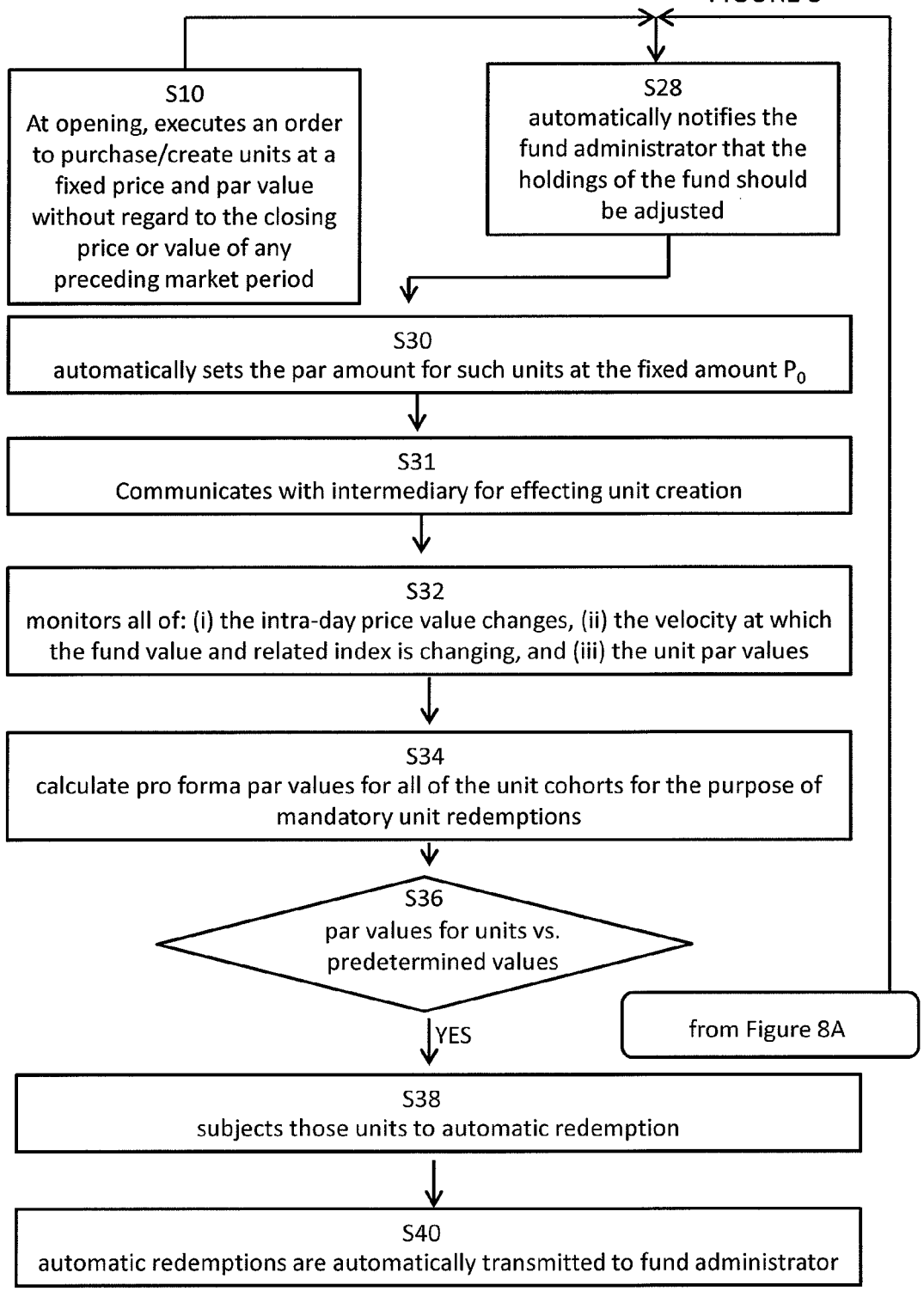
FIGS. 8, 8A, 9, 10 and 11 are flowcharts representing steps performed by the disclosed embodiments in carrying out the described methods and processes.

Continuing with reference to FIG. 1, and beginning with the investors/holders 11, an intermediary 13 receives (from a new investor or a current holder), an originating order or order flow 12 to purchase units, sell units or redeem units at any point during a market period from open through to the close. With reference to order flow 12 at a period open, such orders to buy or sell are made and executed by the communication 16 with the units creation system 22 and at Step S10 (FIG. 8) at a fixed unvarying price without regard to the closing price of any preceding market period (e.g. $10.00 or $1.00). In connection with a market or period open order flow 12, the system communication 14 will result in unit system creation redemptions or creations 16 based on the character of the order flow 12 (a purchase order flow 12 will result in unit creations, and redemption order flow 12 will result in a redemption of units). The par value per unit is a fixed value (e.g. $0.01) for units originated in order flow 12 at a period or market open.

Figure 8A:
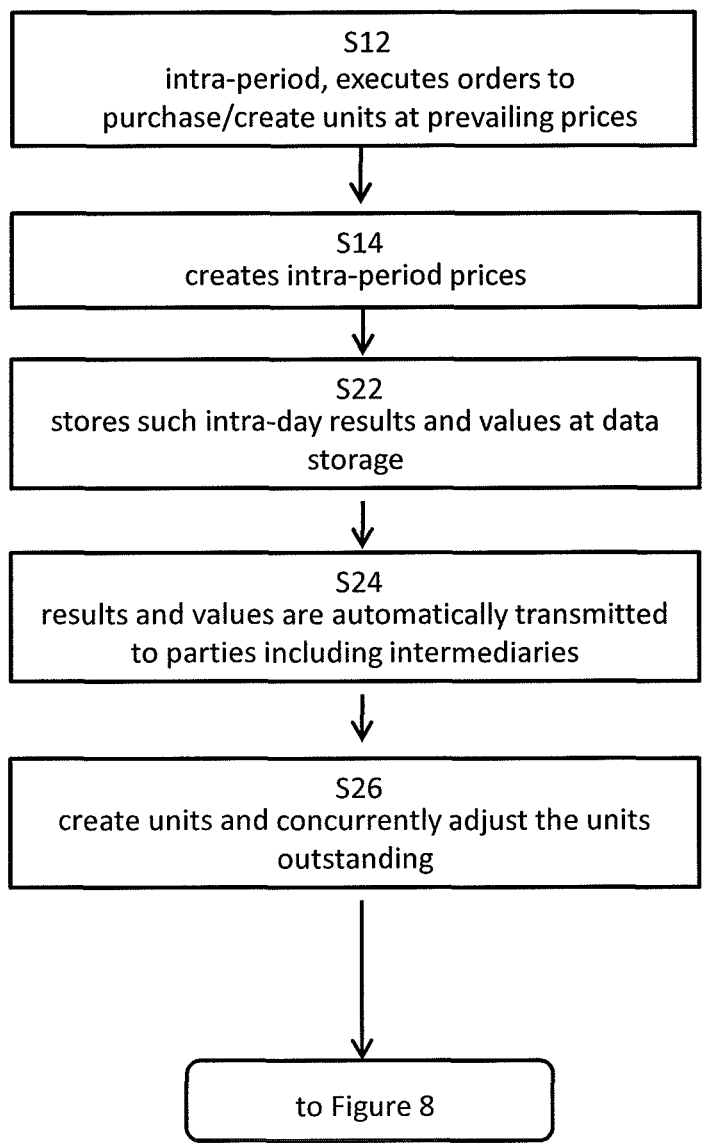

With reference to order flow 12 received intra-period, orders to buy or sell are made at, and executed by communication 18 with the unit creation system 22 and at Step S12 (FIG. 8A) at prevailing intra-period unit prices calculated in a manner essentially similar to the manner and method depicted in the Intra-Period Price Algorithm 62 in FIG. 4. It is to be noted that Step S12, as illustrated, does not necessarily follow Step S10, but such are consecutively numbered for the sake of explanation of the disclosed embodiments. In connection with an intra-period order 12, the system communication 18 will result in unit creation system redemptions or creations 20 based on the character of the order flow 12.

The system automatically creates such intra-period prices by accessing the routine and datasets of FIG. 4 and Step S14. The Intra-period Price for units will be calculated in a manner essentially similar to:

$$\text{Price}_m = \text{Price}_{t-1} \times [1 + (P_0/P_{t-1} + (L-1)) \times R_m \times P_{t-1} \times (1/P_0)].$$

As will be discussed in greater detail below, for the Intra-Period Price Algorithm 62 in FIG. 4:
  (i) Price is reset to a fixed value (e.g. $10/unit, $1.00/unit or another fixed value) at each close and initial (creation) par is set to a fixed value (e.g. $0.01, $0.001 or another fixed value);
  (ii) $\text{Price}_m$=per unit price during a market period;
  (iii) P=par or similar record value (where par is applied to each unit to indicate its return and liquidation entitlement and where t−1 indicates as of the immediately preceding period (t) or related market open); the formulas for the manipulation of par is that of FIGS. 2 and 3, and discussed below, and remains constant for any trading period;
  (iv) L=leverage factor as a real (i.e., non-absolute) value (e.g. 2 for 2× levered fund, and −1 for −1× inverse fund); and
  (v) $R_m$=the fund or index return inclusive of fees and expenses during the related market period. That is, $R_m$ changes throughout the day based on typical market forces and $R_m$ also includes the percentage equivalent of fees and expenses.

In addition, at any time during a market period, the disclosed Unit Creation System (detailed below) can be accessed for the immediately preceding (or current) par value to determine the intra-period price for a unit. The intra-period price can reside within the system as either a static table or computer algorithm. Accordingly, FIG. 4, Unit Intra-Period Lookup Table 60 (discussed in greater detail, below) is an exemplary embodiment of a representative dataset relating to the intra-period unit prices.

In any implementation for determining the intra-period price, the system automatically transmits and stores such intraday results and values at computer system storage 30 and intra-period database 34 and Step S22. For example, such results and values are automatically transmitted through system communication 38 to the parties including intermediaries 13 through an investor account holdings interface 39 and Step S24. The par value per unit is also a fixed value (e.g. $0.01, $1.00, $0.0001 or any other fixed value) with respect to intra-period creations through intra-period order flow 18 with the units creation system. Such unit purchases trigger the system to create units, and, as indicated, function as a "units creations system" and concurrently adjust the units outstanding stored in the units outstanding dataset 32 and Step S26. As can be appreciated, the "creation of units" is similar to selling previously undistributed stock shares.

Additionally, the unit purchases relating to order flow 12 (opening and intra period orders) illustrates that the system automatically notifies the fund administrator 24 that the holdings of the fund 26 should be adjusted (step S28). In the transaction types where (i) the system has created units, (ii) the system has redeemed units, or (iii) unrelated parties have transacted pre-existing units among themselves, the system automatically sets the par amount for such units at the fixed amount (e.g. $0.01, $1.00, $0.0001) at Step S30. The systematic resetting of the par values on transferred shares insures that the new investor will properly track fund and index returns as described above.

Continuing with reference to FIG. 1, the intermediary 13 communicates with the unit creation system 22 using various options at Step S31. Such options include: (x) an interface with the fund administrator; (y) a data-link relating to an exchange or market; and (z) a data-link with the system directly. As illustrated, with reference order flow 12: (i) order flow 12 from investors/holders at open triggers system unit creation or redemption 16; and (ii) order flow 12 from investors/holders during a period triggers system creation or redemption 20.

The units creation system 22, intra-period monitors all of: (i) the intra-day price value changes, (ii) the velocity at which the fund value and related index value is changing, and (iii) the unit par values stored in the Par Value Database 36 and at Step S32. Through this automatic monitoring, the system may calculate pro form a par values for all unit cohorts (that is, a cluster or grouping of shares created at one time and considered one unit where a fund will have one or more cohorts) for the purpose of mandatory unit redemptions at Step S34. In general, at Step S36 the system determines whether par values for unit cohorts are at or above predetermined high levels and such units are subjected to automatic redemption by the system at Step S38.

An automatic redemption can be triggered by an event, such as the value of par reaching three-times the original/acquisition par value. This can occur inter or intra investment periods. At such a trigger event, the system automatically categorizes the units as redeemed so as to shield the unit owner from further risk of loss, and notifies the fund administrator to redeem the same at the fair market value (FMV).

As more completely described below and illustrated in the "Adjusted Units Over 4 Market Periods" graph 72 and the "Adjusted Par/Nominal Value Over 4 Market Periods" graph 72, and also discussed in greater detail below, par values for the units outstanding are manipulated by the system in an opposite direction of the actual value of the units outstanding. Par values that are high relative to others (or high relative to the initial par value) indicate unit cohorts which have suffered large declines. As indicated, in order to retain positive unit values (and eliminate the risk of a socialized loss within the fund) such unit cohorts are automatically redeemed by the system (steps S36 through S40).

Figure 9:
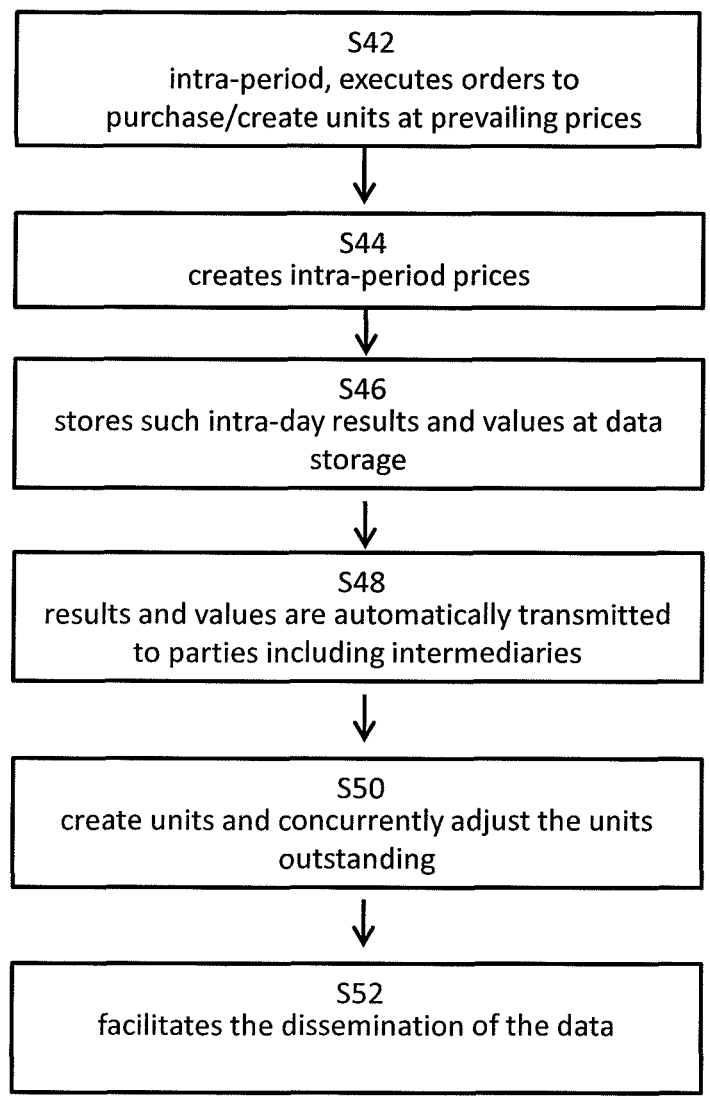

Actions at by the units creation system 22 intra-period relating to the automatic redemptions are automatically transmitted 23 to the fund administrator 24 and at Step 40, as performed with Step S28, above. The fund administrator adjusts the fund's holdings 28 accordingly at Step S42 (FIG. 9). Actions by the units creation system 22 include transmitting units outstanding data to the system at a computer system storage unit 30 and at Step S44, and to the units outstanding database 32 within such storage unit and at Step S46. At Step S48, the system automatically calculates intra-period prices for monitoring by the units creation system intra-period as described above at Step S14. This is done through accessing computer routines essentially similar to the routine depicted in FIG. 4, the Intra-Period Price Algorithm 62 and the related variables legend 63.

The system stores the results' of the intra-period price computer routines in a dataset essentially similar to the Unit Intra-Period Lookup Table and Database 60 and Step S50. Such dataset is stored in the Intra-Period Price Database 34. In addition, such dataset is accessible by intermediaries 13 (see Step S22 et seq). The system facilitates the dissemination of the data in the Intra-Period Price Dataset 34 to intermediaries 13 (see Step S52).

Figure 10:
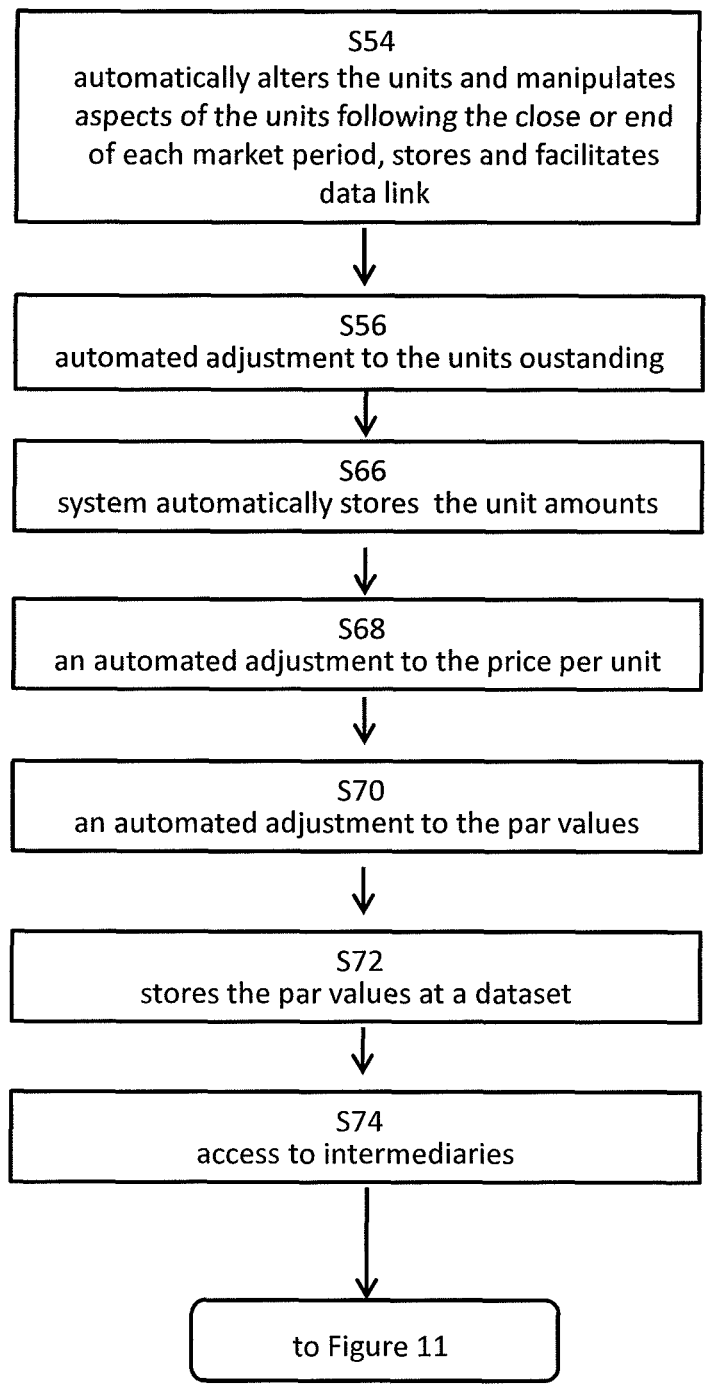

Continuing with reference to FIG. 1, and the post-close units creation system processes 25, the system automatically alters the units and manipulates aspects of the units following the close or end of each market period at Step S54 (FIG. 10). To do so, the system automatically runs the embodied algorithms (FIGS. 2-4 algorithms 46, 47 and 56), stores the revised data for access by parties (FIG. 1, Intra-Period Price Sub-System and Dataset 34 and Par Value Sub-System and Dataset 36), and facilitates a data link 37 of such datasets to parties at Step S74, as will be further disclosed herein. More granularly, continuing with reference to FIG. 1 at units creation system post-close 25, the first (1$^{st}$) post-close manipulation performed is an automated adjustment to the number of units outstanding at Step S56. The computer system storage device 30 accesses embodied routines in the following manner: (i) the system accesses a routine essentially similar to the routine specified in FIG. 2 the Units Adjustment Algorithm 46 with reference to the variables legend at FIG. 2 48, and Step 62.

In the above processes, par or notional adjustment from period to period, and which will again be addressed in greater detail below, is:

$$P_t=(S_{t-1} \times P_{t-1})/S_t \times (1+(\text{Price}_{t-1}-\text{Price}_0)/\text{Price}_0.$$

In addition, in the preceding manipulations:
S=units outstanding
P=par or essentially similar notional value, $P_0$=$0.01 in the figure, but may take any other non-zero value
Price$_{t-1}$=the acquisition price for the related period, a fixed value for pre-existing units (not to be confused with the intermediate price intra-period market Price$_m$ calculated in FIG. 4 with the Intra-Period Price Algorithm 62).

Note that Par, which is a function of Price$_{t-1}$ (an acquisition price) is flat during a trading period. There are 2 states where an investor holds units during a period: state (1) in which the investor held units at the open (either from the prior period in which case the investor's price is reset to $10 (or an alternate fixed value) or acquired at the open in which case the investor's unit would be created at $10 (or an alternate fixed value)), and state (2) in which the investor holds units the investor first acquires during a trading period at some prevailing intra-period price, for example, $15.

Accordingly, for each state, unless assets of the fund are sold or otherwise reduced relating to fees, expenses or other non-unit claims on fund assets, par is constant for each holder relative to the investor's holding during the related period. That is, there is one instance of $P_{(t-1)}$ for a given holder who holds for a given period. All holdings which carryover a period end are $10 for $P_{(t-1)}$. If assets of the fund are reduced through fees, expenses or non-unit claims, par will be reduced proportionally across all units.

The above articulation of par is very useful, because it provides for the appropriate intra-period prices and unit adjustments regardless of how a new holder effects acquisition. That is, prices and units are all properly adjusted whether the investor acquires units through the fund administrator 24 or from an existing holder at a intra-period price which deviates from $10 (or another fixed price).

The system automatically stores the unit amounts at Units Outstanding Sub-System and Dataset 32 and at Step S66.

With reference to FIG. 1 at Post-Close Units Creation System 25, the second (2$^{nd}$) manipulation performed (Step S68) is an automated adjustment to the preset price per unit. That is, the system automatically adjusts the new price level (which applies as soon as the units amounts are adjusted) to a fixed level (e.g. $10, $1.00, or another fixed positive value) for all units regardless of any preceding closing price. Such price adjustment is executed by the system for all units.

Continuing with reference to FIG. 1 at Post-Close Units Creation System 25, the third (3$^{rd}$)) manipulation performed (Step S70) is an automated adjustment to the par values or an essentially similar unit metric. To do this, the Computer System and Storage Device 30 accesses embodied routines in the following manner:

(i) the system accesses a routine essentially similar to the Par Adjustment Algorithm 47 specified in FIG. 2 (and Step S70), which is the formula for $P_t$, introduced above, and introduced above in the discussion of the modification to the units, discussed at Step S62; and (ii) the system automatically stores the par values at a dataset essentially similar to that outlined in FIG. 3, Par Values Lookup and Datatable [#here], discussed below. Such dataset is stored at FIG. 1, Par Values Sub-System and Dataset 36 (step S72) and accessed by intermediates through communication 37 and Step S74.

As indicated in the FIG. 3, for any Market Date, the Unit Creation System can be accessed by the dated/creation date to either revalidate the applicable number of units for a holder or to reconstruct intervening holdings and values.

Figure 11:
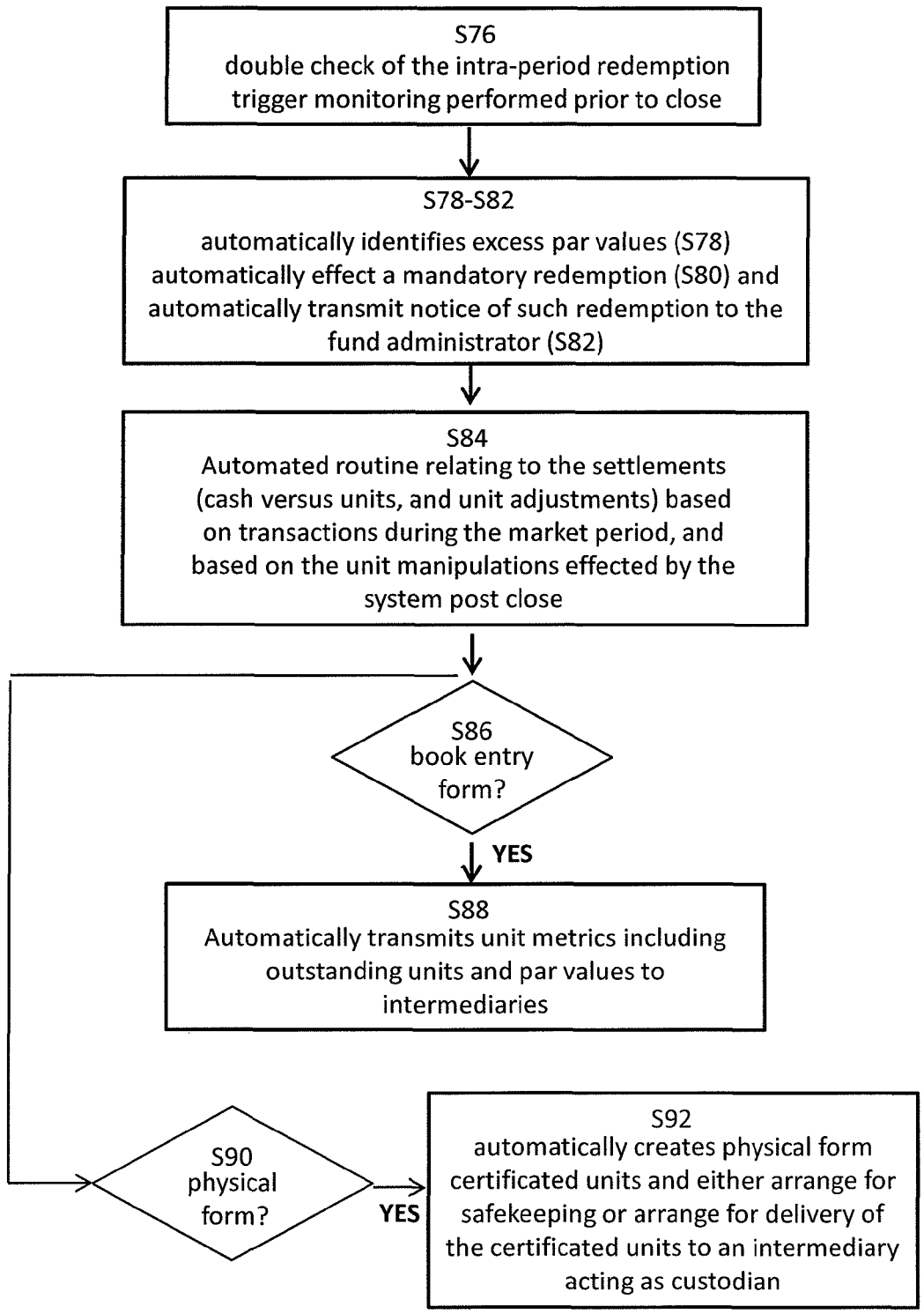

Continuing with reference to FIG. 1 at Post-Close Units Creation System 25, the fourth (4$^{th}$) manipulation performed (Step S76)(FIG. 11) is an automated routine essentially similar to a double check of the intra-period redemption trigger monitoring (Step S76). Based on the actual revised par values stored at Par Value Sub-System and Dataset 36 the system automatically identifies excess par values and automatically effects a mandatory redemption and the system automatically transmits notice of such redemption to the fund administrator at Step S78-S82, in a manner similar to communication 23, tracing Steps S36-S40, above.

Continuing with reference to FIG. 1 at Post-Close Units Creation System 25, the fifth (5$^{th}$) manipulation performed (Step S84) is an automated routine relating to the settlements (cash versus units, and unit adjustments) based on transactions during the market period, and based on the unit manipulations effected by the system at post-close.

The system determines whether the units are book-entry in form at Step S86. If so, the system at communication link 38 automatically transmits unit metrics including outstanding units and par values to intermediaries drawing from the Sub-systems and Datasets 32, 34 and 36 (Step S88).

The system determines whether the units are physical at Step S90. If so, the system automatically creates physical form certificated units and either arranges for safekeeping or arrange for delivery of the certificated units to an intermediary acting as a custodian as indicated at communication 38 and Step 92.

A basic illustration of the system, in the context of a money market fund, follows to illustrate the manner in which the algorithms referenced in the figures are employed in a real world example; for a single period in the example, it is assumed that the market return on the fund positions is zero, and it is further assumed that the fund has a periodic fees (or expense) of 0.05% which is incorporated into the fund return.

In the money market example, the fund return ($R_m$ in the Units Adjustment Algorithm 46) is the sum of the assets return and expenses or 0%-0.05% for a result of negative 0.05%.

Further, assuming that the money market fund example's initial units outstanding are 100, the initial price is $1.00, the initial par value is $0.01, and leverage is 1. Combining the initial values with a return of negative 0.05% into the Units Adjustment Algorithm 46 creates the following system change in units:

$$S_t = 100 \times 1.00 \times [1+(0.01/0.01+0) \times -0.05\% \times 0.01 \times (1/0.01)]/1.00$$

$$S_t = 99.95$$

Applying the Par Adjustment Algorithm 47, the system revised par amount is:

$$P_t = (100 \times 0.01)/99.95 \times (1+(1.00-1.00)/1.00)$$

$$P_t = 0.0100050025$$

Until assets are sold or otherwise distributed to satisfy fees or expenses, the units claim on the fund assets can be determined as the product of (i) $S_t$ or 99.95 and (i) $P_t$ or 0.01000500251.000500250 and (iii) $1/P_0$ or 100, for an aggregate claim of 100.

Continuing with the money market example, once assets are otherwise sold or disposed of in satisfaction of fees and expenses (and legally beyond the claim of unit holders), the adjustment to par (Pt) is as follows:

$$P_t' = P_t - ([\% \text{ assets removed}] \times P_t)$$

$$P_t' = 0.0100050025 - [5\% \times 0.0100050025]$$

$$P_t' = 1.000000$$

Where Pt' is the revised Pt, and the value for all subsequent $S_t$ and $P_t$ system adjustments.

Figure 6:
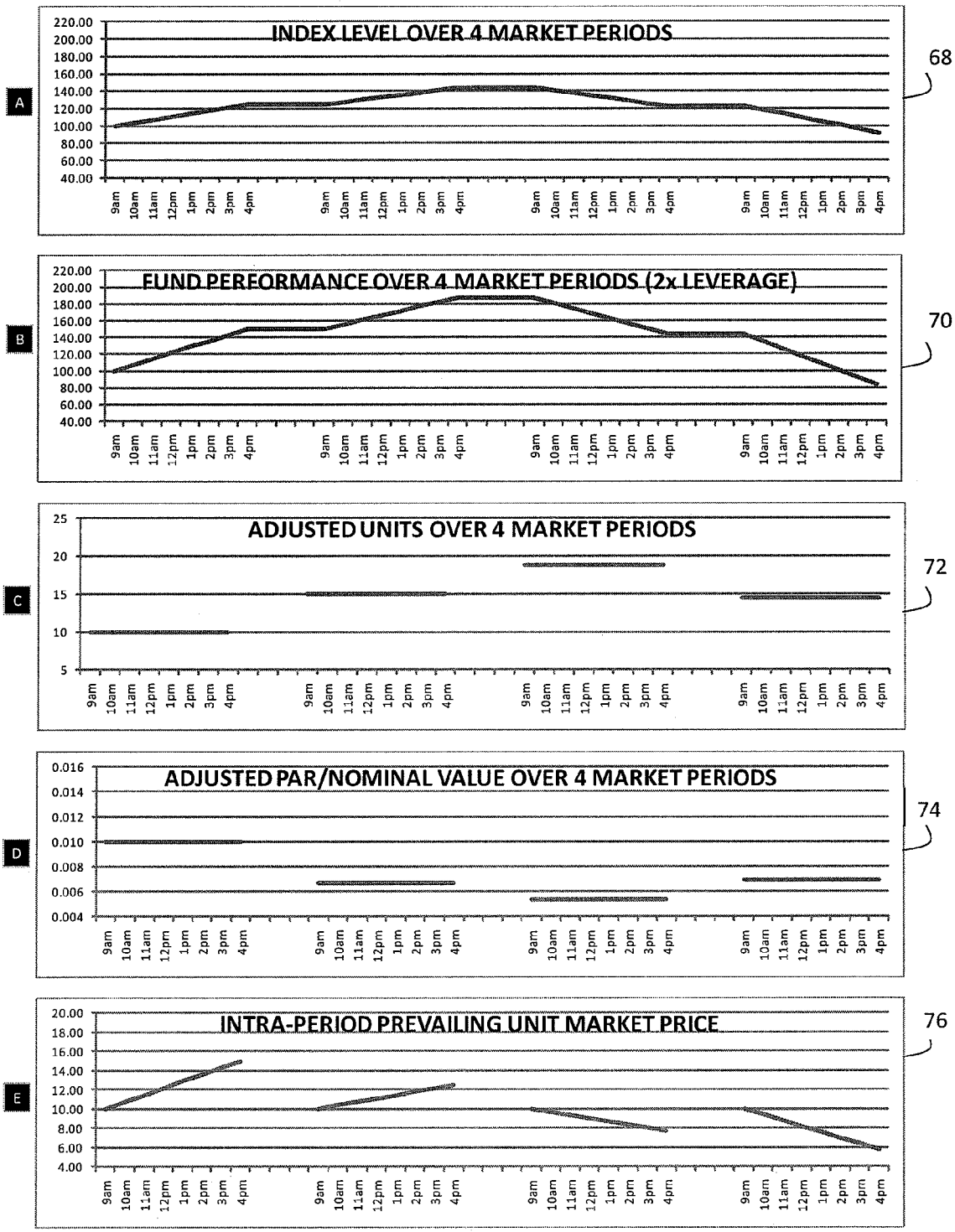
FIG. 6A-E are timeline graph illustrations which demonstrates the manner in which the disclosed technology creates and adjusts the units of the fund in response to linked index levels and fund performance; the illustration relates to a (2)-times leveraged fund depicted over four market periods.

[FIG. 2, with cross reference to FIGS. 1, and 6]

Continued reference is now made to FIG. 1, 2 and, in addition, to FIG. 6. FIGS. 1 and 2 have been identified, and FIG. 6 is a timeline illustration which demonstrates the manner in which the disclosed technology creates and adjusts the units of the fund in response to linked index levels and fund performance. The illustration in FIG. 6 relates to a two times leveraged fund depicted over four market periods. "Intra-Period Prevailing Unit Market Price" 76 illustrates how the per unit price is reset to the initial creation unit price at the commencement of each trading session ($10 in the depicted example). "Adjusted Units Over 4 Market Periods" 72 and "Adjusted Par/Nominal Value Over 4 Market Periods" 74 illustrate the systems manipulation of the units relating to the number of units and the par or nominal value of the associated units.

FIG. 2 illustrates the automated manner in which the system operates over the cycle of a market period with respect to the units. The inputs to the automated steps indicated in FIG. 2 are: (i) the data created and stored by the system; (ii) the party transactions communicated to the system through intermediaries; and (iii) the exogenous market factors and inputs including changes in the level of the targeted index.

With further granularity in explanation, as illustrated in FIG. 2, the system performs the following: (i) the automated creation of units (either at inception of a market period as indicated System Interaction 42 or during a market period as indicated at System Interaction intra-period 44) (see Steps S10, S12); (ii) the automated reporting of intra-period price values during a market period indicated at System Interaction 44 (see Step S24 et seq); and (iii) the automated adjustment/manipulation of units immediately following each market period relating to unit counts, the "Unit Adjustment Algorithm" 46 and relating to par values, the "Par Adjustment Algorithm" 47 (see Step S56, et seq).

As indicated at System Interaction at open 42, new unit creation at the open of a subsequent market period occurs at a fixed price (e.g. $10) (see Step S30), regardless of any immediately preceding market period closing price. As indicated at System Interaction intra-period 44, the system performs and communicates both: (i) the adjustment of the number of number of outstanding units based on intermediary activity (see Step S56 and S66, et seq); and (ii) the automatically calculated intra-day prices (see Step S14 et seq).

As mentioned above with reference to FIG. 2, post-close of each market period, the system automatically adjusts both the outstanding number of units (see Steps S56 and S66, et seq) and the par value (see Step S70) (or essentially similar metric) associated with the units. The system manipulates the units using a formula essentially equivalent to Units Adjustment Algorithm 46 in FIG. 2 (Step S54 and S56).

The system manipulates the par or notional values for all units utilizing a routine essentially similar to that indicated in the final algorithm of FIG. 2, the Par Adjustment Algorithm 47 (see Step S70). As described with respect to FIG. 1, the sequence of system processes are to adjust unit amounts first, followed by an adjustment to par or nominal values.

Turning to FIG. 3, the Par Value Lookup Table and Database 52 is the data from the units creation system. The output is the resulting data provided to brokers and other intermediaries. The three columns are the market date, the creation date and the par value. The first set of entries identify that the market date is Apr. 1, 2011, the creation date of Jan. 1, 2011 and the par value of 0.0150. The second set of entries identify that the market date is still Apr. 1, 2011, the creation date of Jan. 2, 2011 and the par value is 0.0155. As indicated, par can change day to day but not intra day. The value of par is adjusted based on the outstanding shares and the par from the previous or acquisition period. FIG. 6 et seq provide a fuller demonstration of the changes in par.

[FIG. 4]

Turning to FIG. 4, the Figure illustrates an exemplary embodiment of the system's automated routines and the dataset configuration for storage and access of intra-period price values. A routine essentially similar to the Intra-Period Price Algorithm 62 (see Steps S14 et seq) is utilized by the system to automatically generate intra-period market unit prices for funds.

An exemplary embodiment of the variables legend 63 applicable to the routines is at the bottom of FIG. 4. The Intra-Period PriceLookup Table and Database 60 indicates an exemplary embodiment of the dataset automatically created and maintained by the system. Such dataset would be accessed by intermediaries in the manner described in reference to FIG. 1, Intra-Period Sub-system and Database 34 (see Step S22 et seq).

More specifically, the input is the data from the units creation system. The output is the resulting data provided to brokers and the like. The three columns are the par value, the intra-period return and the intra period price. The first set of entries identify that the par value is 0.0000100, which is fixed for a given day. The intra-period return (percent difference) is 3.001%, and the intra period price is $10.010. The second set of entries identify that the par value is 0.0000100 (same day, so no change), the intra-period return is 3.002% and the intra period price has become $10.015. The change in price is the only variable on the right side of the equation which changes during the course of the single trading period (see FIG. 6, discussed below).

Continuing with reference to FIG. 4 and the Intra-Period Price Algorithm 62 and the legends 63 (see Step S14 et seq), the system is capable of computing, storing and disseminating all intra-period price data largely based on self-contained routines and self-generated data and interim results. As indicated, for the automated creation of the intra-period price values, the only material exogenous input required is the index return performance applicable to the related partial market period. Such exogenous items identified as a variable essential similar to non-fee, non-expense component of $R_m$, introduced above, and indicated at the bottom of FIG. 4.

[FIG. 5]

FIG. 5 is an additional alternative embodiment of the system as compared with par value creations illustrated in FIG. 3. Referring to the Dated Date Table 66 in FIG. 5, a value essentially the same as the par value, or a value which serves essentially the same function as the par value can be calculated, stored and utilized in essentially the same manner as the par value. Such value would be automatically fed into the routines of FIGS. 2, 3 and 4.

That is, the units may not carry varying par amounts as described elsewhere herein. For such units, the creation date, dated-dated, or other representation of the timing of the unit creation would be maintained in data storage by the system.

In addition to storage and linkage of units with a representation of their creation date, the system will also create, calculate and store such factor or essentially similar value. This value will serve the same essential purpose as the par value in respect of the system manipulation of the number of outstanding units.

As illustrated in FIG. 5, the system or system computers will index into a dataset similar to that depicted elsewhere herein. Through a unique record identification, such unique record identification specified by: (x) the related market period identifier; and (y) the dated date or creation date of the related units.

The chart of FIG. 5 (the Dated Date Table 66) is essentially FIG. 3 (the Par Value Lookup and Database 52) with an additional column, as will be appreciated. That is, the input is the data from the units creation system. The output is the resulting data provided to brokers and the like. The four columns are the market date, the units creation date, the par or similar value, and the factor or similar value.

The first set of entries identify that the market date is Apr. 1, 2011, the units creation date is Jan. 1, 2011, the par value is 0.01500 and the factor (additional column) is 150.0, that is, essentially, par×$10^4$. The second set of entries identify that the market date is still Apr. 1, 2011, the units creation date is now Jan. 2, 2011, the par value is 0.01550 and the factor is 155.0, that is, again, essentially par×$10^4$.

Such factors are capable of being utilized instead of par in the calculations relating to unit and price modifications. As can be appreciated, the order of magnitude of the factors should be taken into account to provide the proper results.

That is, as seen in the illustration, the created value is essentially similar to the par value and: (i) has been adjusted by the system in a manner inverse to the system units adjustments; or (ii) has been adjusted by the system positively, but through intermediate steps affects the same direction and order of magnitude change to the system's unit processes.

Accordingly, the disclosed technology of Figure encompasses such an additional alternative embodiment which:
(a) access is provided by the system through indexing to a dataset with indexing keys or record identifiers including the system created and stored unit dated-dates or unit creation-dates; and
(b) a factor is calculated and extracted by the system, that is serving as a substitute for the par value, wherein: (x) such factor either adjusts in an inverse manner to the units amounts over time; or (y) the system routines are altered to produce the same effect as an inverse adjustment.

[FIG. 6]

Reference is made to FIG. 6, which is a graphical timeline illustration of four independent market periods (hours of day are indicated below each graph's x-axis). The sub-parts of FIG. 6 illustrate representative relational movements in the amounts and values automatically calculated by the system. FIG. 6 is comprised of five parts (A through E—also 68, 70, 72, 74, and 76). Within each part, the x-axis is labeled 9 AM to 4 PM for each of four daily market period illustrations.

The "Index Level Over 4 Market Periods" 68 is a graphical depiction of a potential return path of the related index. Note that the index demonstration rises over days 1 and 2 (at a decreasing rate of gain for the second day as compared to the first day, as can be seen by comparing the slope angles), and declines over days 3 and 4 (at an increasing rate as can be determined by comparing the slope angles). The index is flat between periods.

The "Fund Performance Over 4 Market Periods" 70 is the demonstrated return of the fund which is targeted to return (2)-times the return of the index. Note that the pattern and timing of increases and decreases is identical as compared with graph 68. The order of magnitude, however, is greater for graph 70 than graph 68 (leveraged 2 times).

The "Adjusted Units Over 4 Market Periods" 72 is a demonstration of the adjusted units, which changes only inter period. The values in this part could be calculated using the Units Adjustment Algorithm 46 in FIG. 2, assuming initial par of 0.010 and the number of units is 10. The number of units is set at the beginning of the trading period and remains constant for that period unless an acquisition or redemption is required, which is not illustrated in this Figure. The "Adjusted Par/Nominal Value Over 4 Market Periods" 74 is a demonstration of the par value adjustments. As with graph 72, the par value is set at the beginning of the trading period and remains constant for that period. Also, as indicated, graphs 72 and 74 illustrate that par follows the change in index and follows an inverse path as compared to the change in value for the units for reasons stated and illustrated below.

The "Intra-Period Prevailing Unit Market Price" 76 is a demonstration of automated intra-period price values. While the number of units may remain constant, the value of the units changes during the trading period as a function of the index, that is, the value moves with the fund performance. As indicated, the unit price is reset to a fixed value (e.g. $10) at the commencement of a new period.

Continuing to reference FIG. 6, the following is a numerical example thereof. Graph 76 indicates a day 1 rise in intra-period price from $10 to $15, which is a 50% increase in value. Graph 72 indicates an increase in outstanding units from the close of day 1 to the open of day 2 of 10 to 15. This is because the price of the units outstanding is brought back to $10 on the second day, so that the leverage would be increased based on the previous period gains. This increase in leverage is realized by an increase in units outstanding at the reset price.

Graph 74 indicates that the par value is adjusted from the close of day 1, to the open of day 2. That is, the reset value for the units is based on a balancing offset in the par value. The value of the units outstanding is adjusted downwardly on the second day by downwardly adjusting the par value. Had the value of the units outstanding dropped, par would be inflated in the next period to properly reset the value of the units outstanding. As a simple illustration, a holder of 1 unit, would enjoy a 50% increase in intra-period price value over the course of day 1.

With reference to the Units Adjustment Algorithm 46 and the Par Adjustment Algorithm 47 in FIG. 2, the revised number of units for the open at day 2 is 15 (an increase of 5) as indicated; par changes from 0.01 to 0.00666:

$R_m$ (index return) for day 1 is 25%

$$\text{Units}_1 = 15 = 10 \times 10 \times [1+(0.01/0.01+(2-1)) \times 0.25 \times 0.01 \times (1/0.01)]/10$$

$$\text{Par}_1 = 0.00666 = (10 \times 0.01)/15 \times (1+(10-10)/10)$$

Continuing to day 2 and identifying an index return for day 2 of 15%, the system would automatically adjust the number of units and the par value as indicated:

$R_m$ (index return) for day 2 is 15%

$$\text{Units}_2 = 18.75 = 15 \times 10 \times [1+(0.01/0.00666+(2-1)) \times 0.15 \times 0.00666 \times (1/0.01)]/10$$

$$\text{Par}_2 = 0.00533 = (15 \times 0.006666)/18.75 \times (1+(10-10)/10)$$

Continuing to reference FIG. 6, the other two periods would be addressed by the system in a similar manner.

With respect to the immediately preceding numerical illustration, it is to be noted that these by-hand calculations would not be a substitute for the automated system described herein. This is because the system is expected to perform near instantaneous calculations on large numbers of units. During a period (intra-period), near instantaneous means between 1 and 15 seconds, and following a period close, near instantaneous means within 60 minutes. Further, the intra-period prices are calculated and disseminated across units continuously during a market period; here "continuously" should be interpreted to mean without any delay. With of the immediacy and precision of the nature of the system, the central part of the process related to the intra-period values would be performed with a computer system even in the context of a single unit.

Continuing to reference FIG. 6, in the context of a positively leveraged fund relating to systems management of units, par values, and intra-day price values is as follows: (i) the intra-day price increases as the fund rises and decrease as the fund declines; (ii) the units outstanding are adjusted upwards when the ending intra-day price value has risen, and adjusted downwards when the ending intra-day price value has declined; (iii) the par value is adjusted in a direction opposite to the units adjustment; and (iv) at the inception of each period, the prevailing unit market price is a fixed number (e.g. $10).

[FIG. 7]

FIG. 7 is a real world example of the disclosed embodiments over 5 market periods during which the index returns are +25%, −15%, +15%, −25%, and 0 for the five market periods respectively. "Disclosed: Inverse −1" 77 is a table generated by the system algorithms in the context of a fund targeted to produce a return which is inverse or −1 times the index. "Disclosed: Leveraged +2" is a table generated by the system algorithms in the context of a fund targeted to produce a return which is 2-times leveraged to the index.

Continuing with FIG. 7, the 5 period basic index return (i.e. not inverse and not leveraged) is equal to (i) 1.00 minus (ii) the sum product of: (1.25), (0.85), (1.15), (0.75), and (1.00). The basic return is equal to −8.359%. A fund targeted to deliver a −1 inverse return should return +8.359% over the simulation, and a fund targeted to deliver a +2× should return −16.72% over the simulation. Continuing with FIG. 7, "Disclosed: Inverse −1" 77 illustrates the units, par values, and post adjustment prices created by the system algorithms for each period. In particular, at the end of period 5, the number of units is 10.836, par is 0.00923, and the aggregate value of the units is 108.36. The system returns are equal to (i) the difference between the ending value and the beginning value [108.36−100], over (ii) the beginning value [100]. The return equal +8.36% which is exactly equal to the mathematical expectation.

Similarly, "Disclosed: Leveraged +2" 78 illustrates the units, par values, and post adjustment prices created by the system algorithms for each period. In particular, at the end of period 5, the number of units is 8.328, par is 0.01201, and the aggregate value is 83.28. Calculating the return in the same manner as above indicates a system return of −16.72% which is exactly equal to the mathematical expectation.

As illustrated below in reference to FIG. 7A, current methods, unlike the disclosed embodiments, produce incorrect and underperforming returns.

[FIG. 7A]

FIG. 7A compares the processes and methods utilized existing funds with the disclosed embodiments. The simulation returns relating to FIG. 7A is identical to the return sequence in FIG. 7. The top table "Inverse or Short Fund" 80 in FIG. 7A is a summary returns comparison of an inverse fund created by the system, and a current or existing inverse fund. The bottom table "Leveraged or Long Fund" 82 in FIG. 7A is a summary returns comparison of a 2-times leveraged fund created by the system and a current or existing 2-times leveraged fund. Like in FIG. 7 above, the return paths for the comparisons is +25%, −15%, +15%, −25%.

Continuing to reference FIG. 7A, columns A and B (in tables 80 and 82 respectively) indicated as "daily index return" are the return sequences through the four periods. Columns C and D (in tables 80 and 82 respectively) indicated as "cumulative return" are the cumulative returns implied by the index movements. In each case (i) 1.00, minus (ii) (1+25%)×(1−15%)×(1+15%)×(1−25%) which equals −8.36% for each table. In other words, the cumulative return column lists the percent change from the starting index to each subsequent index.

Arithmetically, an −8.36% return in the index over a period should indicate that the inverse fund should deliver +8.36% (or −1× the index) and that the 2-times leveraged return should deliver −16.72% (or 2× the index)—just as the disclosed embodiments did with respect to FIG. 7 above. The disclosed embodiment delivers these accurate returns through the system and system algorithms in FIGS. 2, 3, and 4. In contrast, current fund technology delivers returns of −8.36% in the inverse case (table 80), a unit return in the wrong direction, and an index tracking error in absolute terms of over 16% (that is 8.36 minus −8.36%) and in relative terms of 100%. In the case of the 2-times leveraged fund (table 82), the current fund technology delivers returns of −31.75% (i.e. 100-68.25, where 68.25 is the bottom row in the running value column in the Long fund grid); an error of over 15%.

Continuing with reference to FIG. 7A, unlike the disclosed embodiment which systematically rebalances and recasts aspects of the units through the disclosed processes and methods, the conventional fund executes a period-by-period leverage shift in the fund's underlying index and related positions. This is displayed in FIG. 7, column labels J in table 80 and column labels K in table 82.

Referring first to columns J in table 80, the inverse fund begins with $100 in equity (row 1-index move, under column "equity"), suffers a 25% downturn in period 1 (row 1-rebalanced under heading "equity"), with the corresponding to growth of 25% in the index.

Rather than continuing with a consistent amount of fund holdings which would deliver an accurate return, the fund "cashes out" 25% of its equity and 25% of its underlying index holdings. This results in an immediate decrease in its short position from minus-100 to minus-75 (table 80, change in column heading "short" from row "1-index move" to row "2-index move").

Continuing with columns J, and moving to the next rows indicating period 2, the index return drops 15%, and the fund experiences an increase to 86.25 (table 80, row "2-index move" under column "equity". However, the increase is relative to the smaller amount of 75 (the rebalanced position relating to the initial index move in period 1) rather than the original 100.

The disadvantageous rebalancing continues at period 2 and the fund again "cashes out" its 15% gain. This move increases its short position to 99.19 (table 80, row "3-index move" under column "short"), decreasing its equity to 73.31 (table 80, row "3a-index move" under column "equity").

In brief, because the fund positions are changed due to index changes, returns to unit holders are inaccurate. Further in the context of an inverse fund, the current technique forces the fund to reduce its short as the index goes up, and to increase its short as the market goes down; a destructive "buy high-sell low" strategy.

FIG. 7A, table 82, columns "K", demonstrate the same period-by-period "cashing out", and adverse rebalancing of the 2-times leveraged fund. With reference to table 82 columns "K", at inception the long position is 200 (table 82 first entry, under column "long"). The same 25% increase in period 1 causes the value of the fund to increase from 100 to 150 (table 82, row "1-index move" under column "equity").

Similar to the above example of the inverse fund, the 2-times leverage fund, rather than retaining the original positions, "cashes into" an increased long position in the first period, moving the funds exposure from 200 to 300 (table 82, row "1-rebalance" under column "long"). This occurs without any injections of new unit capital.

Following down the columns "K" in table 82 to period 2, the 2-times leveraged fund next suffers a decline as the index drops 15%. As a reaction to the decline, the fund "cashes out", reducing the long position down to 210 (table 82, row "2-rebalanced under column "long").

Thus, in table 82 columns "K", the fund begin with long units of 200, increases its position to 300 long units when the index increases, and the lowers it position down to 210 when the index decreases. This reflects the destructive "buy high-sell low" strategy in the current technology.

The cycles of cashing out for the columns J and K (tables 80 and 82 respectively) can be followed by one skilled in the art who has read this specification. As can be seen, the disclosed embodiments provide a much more predictable investment vehicle than what is otherwise known.

As demonstrated in the comparison of FIGS. 7 and 7A, the disclosed technology produces accurate results under circumstances in which the known methods fail.

In sum, a processes and methods have been disclosed for implemented by means of a computer system which create units, modify units, and manipulate the units of a collective investment vehicle wherein the creation and modification of the units causes the units to accurately track a linked index or specific investment strategy through the execution of steps. The steps include, as an example:

(i) the creation of units at a fixed price and fixed par value (or essentially similar metric) at the opening of any market period, and the creation of units at the then-prevailing market price during a market period at a fixed par value (or essentially similar bookkeeping metric);

(ii) the modification of the par value of units which are traded between investors (i.e. units which change ownership after creation) to a fixed initial par value;

(iii) the monitoring of the par value of cohort unit holdings, such that units which accrue high par values through modification by the processes and systems may be automatically redeemed;

(iv) the creation of the intra-period price values which links unit par value (or essentially similar metrics) to returns for the applicable partial period (returns may be fund returns or index indicated returns) to produce a system generated intra-day transacting price—in the context of investable units essentially similar to ordinary shares (non-debt and non-preferred), said units have a recorded value in the fund taken from one or more of a par value, liquidation entitlement, or other book value notion, which is adjusted in a manner which is opposite to the direction adjustment—in the context of investable units essentially similar to preferred units, preferred shares, debt claims or creditor claims, said units having a liquidation entitlement, unit value, or dated date notion which is indexable into a system or database essentially similar to that depicted in FIG. 5; and (v) at the close of each market period, a manipulation of the number of units outstanding based on the system processes, algorithms and software with the execution of instructions essentially similar to those contained in FIGS. 2, 3 and 4, such that the units reflect an equivalent value based on a reset to the initial fixed price, and further such that the par or essentially similar value is adjusted in a opposing direction (to the units adjustment) or is adjusted in an essentially similar manner which has the same effect, and where a disposition of assets beyond the reach of claim by the units indicates a downward adjustment of par as indicated in FIG. 3 algorithm 56.

Moreover, the methods are stored on a tangible computer medium, such as RAM, ROM, a flash drive or other removable medium, or hard drive or other essentially permanently installed medium, or accessible via a LAN or WAN, WiFi, cellular or other connection, which is capable of being executed locally or remotely, and which is adapted for executing the method disclosed herein.

The above disclosure is not meant to limit the expansive scope of alternatives for the embodiments. Neither the specification, claims, figures nor abstract should be taken as expressly or implicitly limiting the protection available under property rights covered by this instrument.

What is claimed is:

1. A non-transitory computer-readable medium comprising computer-readable instructions for implementing methods which create, modify, and manipulate units of a collective investment vehicle, and cause units to accurately track a linked index or specific investment strategy through the execution of steps, the computer-readable instructions comprising instructions for:

creating units at an initial fixed price and a fixed par value, the fixed par value including values which differ from values at an opening of any market period;

creating an intra-period price value which links the fixed par value to returns for an applicable partial period to produce a system generated intra-day transacting price; and manipulating units outstanding at a close of each market period such that the units determine an equivalent value based on a reset to the initial fixed price, and creating an adjusted par value by adjusting the fixed par value in a counterbalancing direction responsive to the equivalent value determined; and the adjusted par value is determined according to $P_t = (S_{t-1} \times P_{t-1})/S_t \times (1+(Price_{t-1}-Price_0)/Price_0)$, where $P_t$ is adjustment to the fixed par value immediately following a system manipulation; $P_{t-1}$ is actual par value attributed to a unit by the system on an immediately preceding the system manipulation; $S_t$ is number of units outstanding immediately following the system manipulation; $S_{t-1}$ is number of units outstanding immediately preceding the system manipulation; $Price_0$ is a creation price; $Price_{t-1}$ is an acquisition price for the related period, or a fixed value, and $Price_0$, for pre-existing units.

2. The medium of claim 1, wherein returns for any full or partial period are inclusive of gains, losses, fees, expenses and any other non-unit claims over investment vehicle assets and where all such return and expense components are used to reset unit counts following a period close.

3. The medium of claim 1, wherein a positive return for a fund unit cohort will result in increased units and a per unit decreased par value, and a negative return for a fund unit cohort will result in decreased units and a per unit increased par value, and in both instances, the related fund unit cohort price per unit is reset to a fixed amount between periods concurrent with a unit count adjustment and par value adjustment.

4. The medium of claim 1, wherein a unit count is adjusted downwards by the system concurrent with a resetting of one or more cohorts of units to a fixed unit price, in connection with a fund return which is negative due to losses, fees, or expenses or any combination thereof.

5. The medium of claim 4, wherein the fixed par value or other liquidation metric of one or more cohorts is adjusted downward prior to or concurrent with a disposition of any value or assets relating to fees, expenses or other non-unit claims, such that an aggregate effect on all related units is a liquidation entitlement lowered by an amount of fees, expenses or other non-unit claims which gave rise to adjustments.

6. The medium of claim 1, further includes monitoring the fixed par value such that units which accrue high adjusted par values may be automatically redeemed.

7. The medium of claim 1, wherein said units or shares have a recorded value in a fund taken from one or more of: the fixed par value, liquidation entitlement, or a book value notion, which is adjusted in a manner which is opposite to a direction of adjustment of outstanding units.

8. The medium of claim 1, wherein the units are capable of changing ownership after creation.

9. The medium of claim 1, wherein the returns are fund returns or index indicated returns.

10. The medium of claim 1, wherein the units are investable units essentially similar to ordinary shares.

11. The medium of claim 7, wherein the shares are non-debt and non-preferred.

12. The medium of claim 1, wherein a recorded value of the units is investable units essentially similar to preferred units, preferred shares, debt claims or creditor claims.

13. The medium of claim 1, wherein the units are aggregated into one or more cohorts, where each cohort is identified by a common return entitlement, or common price reset, or common par reset, and where each cohort is processed by the system independently.

14. The medium of claim 1, wherein the units have a liquidation entitlement, unit value, or dated date notion which is indexable into a database.

15. The medium of claim 14, wherein the index is a par value equivalent index.

16. The medium of claim 1, wherein units are adjusted according to $St = St-1 \times Price_{t-1} \times [1+(P_0/P_{t-1}+(L-1)) \times Rm \times Pt-1 \times (1/P_0)]/Price_0$.

17. The medium of claim 1, wherein intra-period price values are determined according to $Pricem = Price_{t-1} \times [1+(P_0/P_{t-1}+(L-1)) \times Rm \times Pt-1 \times (1/P_0)]$.

18. A system for implementing methods which create, modify, and manipulate units of a collective investment vehicle to accurately track a linked index or specific investment strategy comprising: a processor; and a memory, the memory including instructions, which when executed by the processor, cause the processor to implement at least one subsystem that: creates units at an initial fixed price and modifies par value of units which are traded between investors to an initial fixed par value; creates intra-period price values which link the fixed par value to returns for an applicable partial period to produce a system generated intra-day transacting price; and manipulates units outstanding at a close of each market period such that the units determine an equivalent value based on a reset to the initial fixed price, and creates an adjusted par value by adjusting the fixed par value in a counterbalancing direction responsive to the equivalent value determined; and the adjusted par value is determined according to $P_t = (S_{t-1} \times P_{t-1})/S_t \times (1+(\text{Price}_{t-1}-\text{Price}_0)/\text{Price}_0)$, where $P_t$ is adjustment to the fixed par value immediately following a system manipulation; $P_{t-1}$ is actual par value attributed to a unit by a financial system on an immediately preceding system manipulation; $S_t$ is number of units outstanding immediately following the system manipulation; $S_{t-1}$ is number of units outstanding immediately preceding the system manipulation; $\text{Price}_0$ is a creation price; $\text{Price}_{t-1}$ is an acquisition price for the related period, or a fixed value, and $\text{Price}_0$, for pre-existing units.

19. A method for creating, modifying, and manipulating units of a collective investment vehicle to accurately track a linked index or specific investment strategy comprising the steps of: creating units at an initial fixed price and modifying, at a computer-based financial system, par value of units which are traded between investors to an initial fixed par value; creating, at the computer-based financial system, intra-period price values which link the fixed par value to returns for an applicable partial period to produce a system generated intraday transacting price; and manipulating, at the computer-based financial system, units outstanding at a close of each market period such that the units determine an equivalent value based on a reset to the initial fixed price, and creating an adjusted par value by adjusting, at the computer-based financial system, the fixed par value in a counterbalancing direction responsive to the equivalent value determined; and the adjusted par value is determined according to $P_t = (S_{t-1} \times P_{t-1})/S_t \times (1+(\text{Price}_{t-1}-\text{Price}_0)/\text{Price}_0)$, where $P_t$ is adjustment to the fixed par value immediately following a system manipulation; $P_{t-1}$ is actual par value attributed to a unit by a financial system on an immediately preceding system manipulation; $S_t$ is number of units outstanding immediately following the system manipulation; $S_{t-1}$ is number of units outstanding immediately preceding the system manipulation; $\text{Price}_0$ is a creation price; Price is an acquisition price for the related period, or a fixed value, and $\text{Price}_0$, for pre-existing units.

* * * * *